(12) United States Patent  (10) Patent No.: US 7,754,377 B2
Ohata et al.  (45) Date of Patent: Jul. 13, 2010

(54) LITHIUM ION SECONDARY BATTERY

(75) Inventors: Tsumoru Ohata, Kyoto (JP); Junji Nakajima, Osaka (JP); Tetsuya Hayashi, Kadoma (JP); Takashi Takano, Hakodate (JP); Shigeo Ikuta, Kawanabe-gun (JP); Kohei Suzuki, Yao (JP); Kouji Nishida, Hirakata (JP); Masao Fukunaga, Sakai (JP); Akiko Fujino, Suita (JP)

(73) Assignee: Panasonic Corporation, Osaka (JP)

( * ) Notice: Subject to any disclaimer, the term of this patent is extended or adjusted under 35 U.S.C. 154(b) by 727 days.

(21) Appl. No.: 11/790,539

(22) Filed: Apr. 26, 2007

(65) Prior Publication Data

US 2007/0202404 A1  Aug. 30, 2007

Related U.S. Application Data

(62) Division of application No. 10/551,934, filed on Oct. 4, 2005, now Pat. No. 7,396,612.

(30) Foreign Application Priority Data

Jul. 29, 2003 (JP) ............................. 2003-281419
Sep. 30, 2003 (JP) ............................. 2003-341644
Oct. 1, 2003 (JP) ............................. 2003-343584
Feb. 2, 2004 (JP) ............................. 2004-025983

(51) Int. Cl.
*H01M 2/16* (2006.01)
(52) U.S. Cl. ...................................... 429/142; 429/129
(58) Field of Classification Search ........................ None
See application file for complete search history.

(56) References Cited

U.S. PATENT DOCUMENTS 4,371,596 A  2/1983  Sheibley (Continued)

FOREIGN PATENT DOCUMENTS

JP  07-220759  8/1995

(Continued)

OTHER PUBLICATIONS

G. Dautzenberg et al., "Characterization of Pan-Based Gel Electrolytes. Electrochemical Stability and Lithium Cyclability," Chemistry of Materials, vol. 6, No. 4, 1994, pp. 538-542.

(Continued)

*Primary Examiner*—Patrick Ryan
*Assistant Examiner*—Cynthia Lee
(74) *Attorney, Agent, or Firm*—McDermott Will & Emery LLP

(57) ABSTRACT

A lithium ion secondary battery includes a positive electrode capable of absorbing and desorbing lithium ion, a negative electrode capable of absorbing and desorbing lithium ion, a porous film interposed between the positive electrode and the negative electrode, and a non-aqueous electrolyte: the porous film being adhered to a surface of at least one of the positive electrode and the negative electrode; the porous film including a filler and a resin binder; the resin binder content in the porous film being 1.5 to 8 parts by weight per 100 parts by weight of the filler; and the resin binder including an acrylonitrile unit, an acrylate unit, or a methacrylate unit.

11 Claims, 5 Drawing Sheets

U.S. PATENT DOCUMENTS

| | | |
|---|---|---|
| 5,882,721 A | 3/1999 | Delnick |
| 5,948,464 A | 9/1999 | Delnick |
| 6,053,953 A | 4/2000 | Tomiyama et al. |
| 6,287,720 B1 | 9/2001 | Yamashita et al. |
| 6,558,840 B1 | 5/2003 | Hikmet |
| 2002/0048704 A1 | 4/2002 | Murai et al. |
| 2002/0136945 A1 | 9/2002 | Call et al. |
| 2003/0113626 A1 | 6/2003 | Maeda et al. |
| 2003/0118896 A1 | 6/2003 | Yamaguchi et al. |
| 2004/0115523 A1 | 6/2004 | Hommura et al. |

FOREIGN PATENT DOCUMENTS

| | | |
|---|---|---|
| JP | 10-055718 | 2/1998 |
| JP | 10-106530 | 4/1998 |
| JP | 10-223195 | 8/1998 |
| JP | 10-241656 | 9/1998 |
| JP | 2000-195491 A | 7/2000 |
| JP | 2000-195492 A | 7/2000 |
| JP | 2002-541632 A | 3/2002 |
| JP | 2002-279956 A | 9/2002 |
| JP | 2002-319386 A | 10/2002 |
| JP | 2004-273437 A | 9/2004 |
| WO | WO 94/20995 | 9/1994 |
| WO | WO 97/06207 | 2/1997 |

OTHER PUBLICATIONS

European Search Report issued in European Patent Application No. EP 04748153.6 mailed Dec. 17, 2009.

Kim et al. "Electrochemical and physical properties of composite polymer electrolyte of poly(methyl methacrylate) and poly(ethylene glycol diacylate)", Journal of Power Sources, 2003, 221-224, V. 124.

http://www.scientificpolymer.com/catalog/descriptions.asp?QProductCode=134, melting point of poly acrylonitrile [reviewed by Examiner Dec. 4, 2006].

LITHIUM ION SECONDARY BATTERY

CROSS REFERENCE TO RELATED APPLICATIONS

This application a Divisional of U.S. Application Ser. No. 10/551,934, filed Oct. 4, 2005, now U.S. Pat. No. 7,396,612 which is the U.S. National Phase under 35 U.S.C. §371 of International Application No. PCT/JP04/010994, filed Jul. 26, 2004 which in turn claims the benefits of Japanese Applications No. JP 2003-281419, filed Jul. 29, 2003, No. JP 2003-341644, filed Sep. 30, 2003, No. JP 2003-343584, filed Oct. 1, 2003, and No. JP 2004-025983, filed Feb. 2, 2004, the disclosures of which Applications are incorporated by reference herein in their entireties.

TECHNICAL FIELD

The present invention relates to a lithium ion secondary battery having a porous film including a filler and a resin binder, and adhered to a surface of at least one of a positive electrode and a negative electrode. The present invention relates to an excellently safe lithium ion secondary battery in which a thermal runaway will not occur even when an internal short circuit is caused.

BACKGROUND ART

As electronic devices become more and more portable and wireless, small and lightweight lithium ion secondary batteries with high energy density, are receiving attention as a power source for these devices. Lithium ion secondary batteries have a positive electrode comprising a lithium-containing transition metal oxide or the like, a negative electrode comprising a carbon material or the like, and a non-aqueous electrolyte.

In lithium ion secondary batteries, a separator is interposed between the positive electrode and the negative electrode to electronically insulate both electrodes from each other, and further to retain the electrolyte. As the separator, a microporous membrane mainly composed of a polyolefin such as polyethylene and polypropylene is used. The microporous membrane is formed by drawing a resin, generally.

However, such separator shrinks with heat under a comparatively low temperature of approximately 100° C. Therefore, a small short circuit may rapidly expand to cause a thermal runaway. That is, when a short circuit is caused by an intrusion of a foreign substance or a nail penetration test, the separator shrinks with the heat instantly generated. Based on such shrinkage, a damaged part of the separator becomes larger to expand the short circuit, causing the thermal runaway. Especially, when in an environment under a temperature over 150° C., the possibility for impairing the battery safety based on the shrinkage of a microporous membrane is high.

Thus, as schematically shown in FIG. 4, an attempt to make a paste electrolyte 40 to function as a separator. The paste electrolyte 40 includes a great amount of liquid electrolyte 41 containing a thickener, and filler particles 42 having electrically insulating property: The filler particles 42 function as a spacer between a positive electrode 43 and a negative electrode 44 (Japanese Laid-Open Patent Publication No. Hei 10-55718).

The paste electrolyte is a composite material of a liquid electrolyte with its viscosity increased by a thickener, and a filler having electrically insulating property. Therefore, the liquid electrolyte is sufficiently included in the paste electrolyte, and the paste electrolyte is excellent in securing lithium ion conductivity of a certain level. However, the paste electrolyte has a defect of impracticality, since its strength as a separator is insufficient.

Also, it has been proposed to use a porous film comprising a filler and a resin binder and being adhered on a surface of at least one of a positive electrode and a negative electrode as a separator (Japanese Laid-Open Patent Publication No. Hei 10-106530).

The porous film is formed by applying a raw material paste comprising a filler, and a resin binder dissolved in a solvent on a surface of an electrode plate and then drying it. Such paste includes fluorocarbon resin, polyolefin rein, or the like as a resin binder.

Further, in order to prevent an inducement of a battery internal short circuit caused by a separation of a part of an electrode material mixture from an electrode plate while manufacturing a battery, there has been proposed to use a porous film and a separator such as the above in combination (Japanese Laid-Open Patent Publication No. Hei 7-220759).

The porous films described in Japanese Laid-Open Patent Publication No. Hei 10-106530 and Japanese Laid-Open Patent Publication No. Hei 7-220759 are excellent to the extent that these can secure a certain level of strength and safety.

However, when a resin binder is dissolved in a solvent and then deposited on a surface of filler particles, as schematically shown in FIG. 5, the area of filler particles 52 covered by a resin binder 51 increases, which necessitates a usage of a great amount of resin binder. As a result, micropores among the filler particles decrease while the strength increases, and paths for an electrolyte or lithium ion between the positive electrode 53 and a negative electrode 54 tend to become insufficient. That is, it is difficult to secure sufficient lithium ion conductivity, while maintaining a certain level of strength.

Additionally, since a resin having suitable properties for a resin binder of porous film is not known, it is difficult to aim for a further improvement of the strength of the porous film, while maintaining lithium ion conductivity.

DISCLOSURE OF INVENTION

The present invention relates to a lithium ion secondary battery having a porous film including a filler and a resin binder and adhered to a surface of at least one of a positive electrode and a negative electrode.

One object of the present invention is to provide a lithium ion secondary battery which can achieve both safety and high-rate characteristics, with a usage of a porous film which can secure heat resistance, necessary strength, and lithium ion conductivity by limiting a resin binder content in the porous film to a small amount, while selecting a constituent monomer of the resin binder.

In order to improve lithium ion conductivity of porous film, micropores have to be formed as much as possible in the porous film. Additionally, in order to form many micropores in the porous film, the amount of resin binder relative to the amount of filler has to be as small as possible. However, even though many micropores are formed in the porous film, when the size of the micropores is inappropriate for the lithium ion transfer, lithium ion conductivity can not be improved to the maximum. In light of the above, one object of the present invention is to improve lithium ion conductivity of the porous film by controlling the average pore size of micropores in the porous film.

Since tensile stress is applied on the electrode plate on which a porous film is formed at the time of forming the electrode plate group, the porous film might crack and cause a short-circuit failure. Although applying conditions and drying conditions of a raw material paste comprising a filler and a resin binder may give effects on the stress-tolerance of the porous film, in the end, the stress-tolerance fairly depends on the elongating percentage of the porous film. However, in order to secure lithium ion conductivity of the porous film, the resin binder content has to be limited to a small amount, so the attention is not given to the limitation of the elongating percentage. In light of the above, one object of the present invention is to improve reliability of a battery by controlling the elongating percentage of the porous film.

When the resin binder is limited to a small amount, although it is advantageous in terms of discharge characteristics of a battery, strength of the porous film weakens and the porous film becomes apt to crack. When the porous film separates from the electrode plate, it induces an internal short circuit, and battery yields will decrease. In particular, in the case of wound type lithium ion secondary battery, a positive electrode and a negative electrode are wound around into a spiral shape interposing a separator between both electrodes. At the portion where the winding starts, radius of curvature is small to increase bending stress, making the porous film apt to crack. In light of the above, one object of the present invention is to suppress an internal short circuit due to occurrence of material mixture separation in the manufacturing processes with a usage of the porous film while maintaining discharge characteristics of a battery, by controlling a distribution state of the resin binder in the thickness direction of the porous film.

The present invention relates to a lithium ion secondary battery: comprising, a positive electrode capable of absorbing and desorbing lithium ion, a negative electrode capable of absorbing and desorbing lithium ion, a porous film interposed between the positive electrode and the negative electrode, a non-aqueous electrolyte, wherein the porous film is adhered to a surface of at least one of the positive electrode and the negative electrode, the porous film comprises a filler and a resin binder, the content of the resin binder in the porous film is 1.5 to 8 parts by weight per 100 parts by weight of the filler, and the resin binder includes an acrylonitrile unit, an acrylate unit, or a methacrylate unit.

The present invention also relates to a lithium ion secondary battery, wherein the average pore size of micropores in the porous film obtained by a Bubble-point Method is 0.02 to 0.09 μm.

The present invention also relates to a lithium ion secondary battery, wherein the elongating percentage of the porous film is 15% or more.

The present invention also relates to a lithium ion secondary battery, wherein the amount of the resin binder is smaller in the first surface side where the porous film is in contact with the surface of the electrode, and larger in the second surface side opposite to the first surface side.

It is preferable that the filler comprises a mixture of a large particle group and a small particle group, and that the average particle size A of the large particle group and the average particle size B of the small particle group satisfy the formula (1):

$$0.05 \leq B/A \leq 0.25.$$

It is preferable that the resin binder comprises rubber particles of core-shell type, and that the rubber particles have an adhesive surface portion.

It is preferable that the filler includes at least $Al_2O_3$.

It is preferable that the resin binder has the decomposition temperature of 250° C. or more.

It is preferable that the resin binder has the crystalline melting point of 250° C. or more.

The present invention also relates to a lithium ion secondary battery, wherein the porous film comprises a single film, and the amount of the resin binder gradually increases from the first surface side toward the second surface side.

The present invention also relates to a lithium ion secondary battery, wherein the porous film comprises a plurality of films, and the content of the resin binder in the total of the filler and the resin binder in a film positioned at the second surface side is higher than the content of the resin binder contained in the total of the filler and the resin binder contained in a film positioned at the first surface side.

It is preferable that the filler content in the total of the filler and the resin binder contained in a surface portion of the second surface side of the porous film is 70 to 98 wt %, when the thickness of the surface portion is 20% of the thickness of the porous film.

The present invention relates to a lithium ion secondary battery in which the positive electrode and the negative electrode are wound in a spiral fashion interposing only the porous film.

The present invention also relates to a lithium ion secondary battery in which the positive electrode and the negative electrode are wound in a spiral fashion interposing the porous film and a separator.

The present invention relates to a method of manufacturing the above lithium ion secondary battery, the method comprising the steps of:

(a) preparing a paste including 100 parts by weight of a filler, 1.5 to 8 parts by weight of a resin binder including an acrylonitrile unit, an acrylate unit, or a methacrylate unit, and a dispersion medium of the filler;

(b) applying the paste to a surface of at least one of a positive electrode and a negative electrode; and (c) drying the paste applied on the surface of the electrode under a temperature of not less than 100° C. to not more than 180° C.

According to the present invention, a lithium ion secondary battery in which well-balanced heat-resistance, necessary strength, and lithium ion conductivity are secured, and in which both safety and high-rate characteristics are achieved can be provided, since the resin binder content in the porous film is limited to a small amount, and the resin binder includes an acrylonitrile unit, an acrylate unit, or a methacrylate unit.

According to an embodiment of the present invention, a lithium ion secondary battery excellent in discharge characteristics such as high-rate characteristics can be provided, since the average pore size of the micropores in the porous film is limited to 0.02 to 0.09 μm.

According to an embodiment of the present invention, a lithium ion secondary battery which achieves both charge and discharge characteristics and reliability can be provided, since the elongating percentage is controlled, and the porous film having sufficient tolerance to stresses generated inside of the electrode plate group is used.

According to an embodiment of the present invention, sufficient micropores for lithium ion to move to the electrode surface side can be secured while securing flexibility of the porous film, since the amount of the resin binder in the porous film is smaller in the first surface side in contact with the surface of the electrode, and larger in the second surface side opposite to the first surface side. Additionally, since the porous film has flexibility, separation of the porous film in manufacturing processes is suppressed to prevent an internal short circuit. Therefore, a lithium ion secondary battery with higher quality and safety can be provided.

BEST MODE FOR CARRYING OUT THE INVENTION

The present invention relates to a lithium ion secondary battery: comprising, a positive electrode capable of absorbing and desorbing lithium ion, a negative electrode capable of absorbing and desorbing lithium ion, a porous film interposed between the positive electrode and the negative electrode, and a non-aqueous electrolyte.

The porous film is adhered to a surface of at least one of the positive electrode and the negative electrode. And the porous film comprises a filler and a resin binder.

The amount of resin binder contained in the porous film is 1.5 to 8 parts by weight per 100 parts by weight of the filler.

When the resin binder content is less than 1.5 parts by weight per 100 parts by weight of the filler, a porous film having sufficient strength can not be obtained. Also, a porous film having a preferable elongating percentage can not be obtained.

On the other hand, when the resin binder content is over 8 parts by weight per 100 parts by weight of the filler, sufficient micropores can not be formed in the porous film and rate characteristics will decline. Additionally, it becomes difficult to control the size of the micropores to the preferable range for the movement of lithium ion.

The resin binder includes an acrylonitrile unit, an acrylate unit, or a methacrylate unit.

In the case when an internal short circuit occurred, the temperature due to the generated heat at the short circuiting portion will become about 100° C. Therefore, when the decomposition temperature and crystalline melting point of the resin binder are low, the porous film may deform and expand the short circuiting portion. In view of avoiding such defects, it is preferable that the resin binder has the decomposition temperature of 250° C. or more. Also, when the resin binder is crystalline, it is preferable that the resin binder has the crystalline melting point of 250° C. or more. The crystalline melting point means the temperature when crystalline polymer starts softening.

Herein, it is preferable that the resin binder includes core-shell type rubber particles having an adhesive surface portion which can exert sufficient binding effects even with a small amount.

When using the core-shell type rubber particles, moving paths for the electrolyte or lithium ion can be sufficiently secured, since filler particles can be adhered by points and more micropores can be secured in the porous film. Also, the porous film can secure sufficient resistance to stress.

Figure 1:
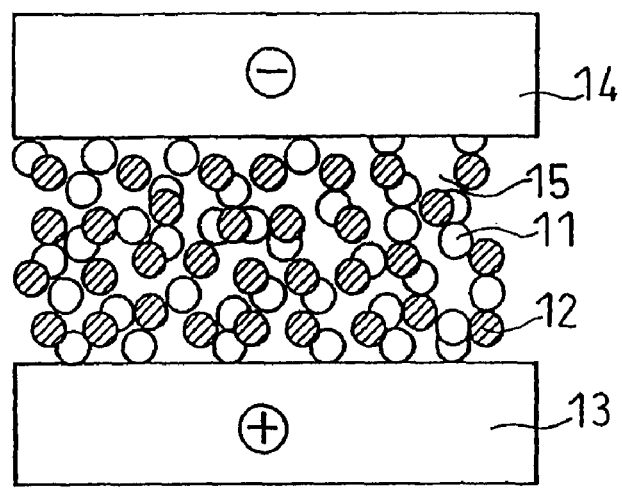
FIG. 1 is a schematic illustration of a structure of a porous film in accordance with the present invention.

The above state is schematically illustrated in FIG. 1. The filler particles 12 are adhered by points by means of core-shell type rubber particles 11, and many micropores 15 are secured between a positive electrode 13 and a negative electrode 14. Therefore, since the movement of the electrolyte or lithium ion is not highly prevented, the lithium ion conductivity is secured sufficiently, and excellent rate characteristics can be maintained. Specifically, moving paths for lithium ion can be secured easily. Also, based on the point-adhesion, even with a usage of the rubber particles in small amount, strength and elongating percentage of a separator can be secured.

The average particle size of rubber particles is preferably 0.05 to 0.3 μm, in terms of obtaining a porous film with well-balanced strength and porosity.

The adhesive surface portion of the core-shell type rubber particles preferably includes an acrylate unit. As for the acrylate unit, 2-ethylhexyl acrylate is preferable.

Conventionally, a resin material used for a battery is selected based on the index for stability of a resin derived from the molecular orbital method (HOMO/LUMO). Based on such index, generally, a resin with a single composition or with a combination (copolymer) is selected. Therefore, a resin binder including an acrylonitrile unit which is unstable under a negative electrode potential is hardly selected from the conventional point of view.

When a plurality of kinds of resin binder are used in combination for a porous film, it is preferable that the ratio of core-shell type rubber particles to the total amount of resin binders is 20 to 80 wt %.

When a plurality of resin binders are used in combination for a porous film as a resin binder, other than the core-shell type rubber particles, fluorocarbon resins such as polyvinylidene fluoride (PVDF), cellulose resins such as carboxymethyl cellulose (CMC), and polyvinyl pyrrolidone (PVP) can be used. Also, in view of giving appropriate viscosity to a raw material paste of porous film, it is preferable that a fluorocarbon resin (for example, PVDF with a molecular weight of a hundred thousand to a million) is used in combination with the core-shell type rubber particles.

In view of a balance between adhesion and rubber elasticity, it is preferable that in the absorption spectrum of the core-shell type rubber particles obtained by an FT-IR measurement, the absorption intensity based on C=O stretching vibration is 3 to 50 times the absorption intensity based on C≡N stretching vibration of the acrylonitrile unit. When the absorption intensity based on C=O stretching vibration is less than 3 times the absorption intensity based on C≡N stretching vibration, binding effects of the rubber particles become insufficient, and when over 50 times, rubber elasticity of the rubber particles becomes insufficient and the strength of the porous film is weakened. The absorption intensity refers to a height of the absorption peak from the base line of the spectrum.

In the FT-IR measurement, absorption spectrum of the core-shell type rubber particles can be measured by using a sample in which the rubber particles are applied on KBr plate, for example. Generally, the absorption based on C=O stretching vibration is observed around 1700 to 1760 $cm^{-1}$, and the absorption based on C≡N stretching vibration is observed around 2200 to 2280 cm$^{-1}$.

It is preferable that the average particle size (median size $D_{50}$ based on volume) of the filler is 0.2 to 2 μm. When the average particle size is too large, a thin (about a thickness of 20 μm, for example), uniform porous film can not be formed easily. When it is too small, necessary amount of the resin binder will increase as the surface area of the filler increases, and it becomes difficult to form sufficient micropores in the porous film.

Additionally, in view of bringing the packed state of the filler close to a closest-packed state, or in view of making the adjustment of the average pore size of the micropores easier, it is preferable that the filler includes a mixture of a large particle group and a small particle group. When stress is applied inside of the porous film in closest-packed state, since the filler particles ease the stress based on "sliding", the film structure can be maintained easily even though the elongating percentage became large.

It is preferable that the average particle size A (median size $D_{50}$ based on volume) of the large particle group is 0.2 to 2 μm. Also, it is preferable that the average particle size B (median size $D_{50}$ based on volume) of the small particle group is 0.01 to 0.5 μm.

It is preferable that the average particle size A of the large particle group and the average particle size B of the small particle group satisfy the formula (1): $0.05 \leq B/A \leq 0.25$. When the value B/A is below 0.05, the surface area of the filler becomes too large, and it becomes difficult to obtain a porous film having a sufficient strength by using a small amount of resin binder. Or, since the surface area of the filler becomes large, the resin binder amount to be used becomes large, and micropores in the porous film tend to decrease. On the other hand, when the value B/A becomes over 0.25, micropores formed among filler particles become too large, to suppress occurrences of capillarity to decline rate characteristics. Additionally, since the micropores to be formed among filler particles will become large, the sliding of the filler will be suppressed to decrease the elongating percentage of the porous film.

It is preferable that the ratio of the small particle group to the total amount of the filler is 1 to 20 wt %. And it is preferable that the rest is the large particle group. When the ratio of the small particle group is too small, it becomes difficult to charge the filler closely, and when the ratio of the small particle group is too large, the surface area of the filler becomes too large, to make it difficult to obtain a porous film having sufficient strength by using a small amount of resin binder.

It is preferable that the filler comprises inorganic oxides including at least an aluminum oxide ($Al_2O_3$). Other inorganic oxides such as titanium oxide ($TiO_2$) and silicon oxide ($SiO_2$) may be used. These may be used alone, or may be used in combination of two or more. However, it is preferable that the ratio of $Al_2O_3$ to the total amount of the filler is 50 wt % or more.

The reasons for using at least $Al_2O_3$ herein are: (1) the median size of $Al_2O_3$ is suitable for the forming of a microporous structure (median size 0.02 to 0.09 μm) desired for the porous film; (2) it is stable with respect to any of the oxidation and reduction potentials (0 to 5 V/vs Li); and (3) its particle surfaces are less uneven (surface area is small), and the porous film having higher strength can be obtained easily by using a small amount of the resin binder.

By applying a raw material paste to a surface of at least one of the positive electrode and the negative electrode, and then drying if necessary, the porous film can be obtained in the state being bonded to the surface of the electrode. It is preferable that the drying is carried out at 50 to 150° C. for 1 minute to 30 minutes. The dried film formed on a surface of the electrode may be arbitrarily rolled afterwards to obtain a porous film.

The raw material paste for the porous film is prepared by dispersing the filler and the resin binder in a liquid component. Water, N-methyl-2-pyrrolidone (hereinafter, NMP), acetone, a lower alcohol, and the like may be used, and a non-aqueous electrolyte may be used for the liquid component at this time.

The raw material (the total of the filler and the resin binder) content in the raw material paste of the porous film is preferably 25 to 70 wt %. When the raw material content is too small, it becomes difficult to form a porous film having a desired thickness and strength, and when the raw material content is too large, the application will be difficult because the paste viscosity will become high.

In a preferred embodiment of the present invention, the average pore size of the micropores of the porous film comprising the filler and the resin binder obtained by the Bubble-point Method is adjusted to 0.02 to 0.09 μm.

Even though many micropores are secured in the porous film, when the average pore size of the micropores is below 0.02 μm, lithium ion conductivity will be insufficient, since transfer of solvated lithium ion is prevented by filler particles and resin binder. On the other hand, when the average pore size of the micropores is over 0.09 μm, capillarity which accelerates transfer of lithium ion can not be utilized, thereby causing insufficient lithium ion conductivity as well.

Herein, the average pore size of the micropores in porous film may be obtained by a Bubble-point Method (ASTM F316-86, JIS K3832). Particularly, the average pore size d can be obtained as a median size by the following method.

(1) First, air pressure is applied from one side of the porous film in dried state, and the relationship between the air pressure P(Psi) and the flow rate of the air passing through the porous film (flow rate D in dried state, unit: liter/min) is obtained.

(2) Next, after a solvent (water, alcohol, or the like) is absorbed by the micropores in the porous film, a contacting interface with the solvent is formed on one side of the porous film and the air pressure is applied from the rear side thereof, to obtain the relationship between the air pressure P(Psi) and the flow rate of the air passing through the porous film (flow rate W in wet state, unit: liter/min). At this time, the minimum pressure which allows occurrences of bubbles at the surface of the porous film (bubble point) is set as $P_0$. At this time, the value W is 0, and when P reaches a certain value, the value of D agrees with the value of W. The minimum pressure where the value of D and the value of W coincide is set as $P_s$.

(3) In the pressure range from $P_0$ to $P_s$, the relationship of P and Δ (W/D) is obtained, and converted to the relationship of d and Δ (W/D) by using the relationship of d=0.451γ/P (γ: surface tension of water, unit: mN/m).

(4) From the obtained converted value, the distribution of the flow rate percentage Q defined as Q=Δ(W/D)×100 is obtained, and the value d is obtained as the median value of d in the distribution. Although the interval of the value P at the time of obtaining the distribution is not particularly limited, it is for example 150 to 250 Psi.

When obtaining the porous film having the micropores with the average pore size of 0.02 to 0.09 μm calculated by the Bubble-point Method as well, it is preferable that the resin binder includes the core-shell type rubber particles having the adhesive surface portion.

The method for controlling the average pore size in the porous film is not limited: The average pore size can be controlled by the viscosity of the raw material paste, the conditions for drying and rolling after applying the paste on a surface of an electrode, and the like.

Although the preferable conditions differ depending upon the kinds of the battery and it can not be generalized, in the case of the battery same as the one in Example 1 mentioned later, for example, it is preferable that the viscosity of the raw material paste is 1000 to 100000 cP, the drying temperature after applying the paste on an electrode surface is 45 to 200° C., and the line pressure of the rolling is about 1 to 1000 kgf/cm.

In a preferable embodiment of the present invention, the elongating percentage of the porous film comprising the filler and the resin binder is adjusted to 15% or more.

Although many micropores could be secured in the porous film, when the elongating percentage of the porous film is insufficient, the porous film can not endure the stress inside of the electrode plate group. In view of suppressing an occurrence of a short circuit and obtaining a highly reliable battery, it is required that the elongating percentage of the porous film is 15% or more.

When the elongating percentage is below 15%, the porous film may crack and the possibility for a short circuit to occur may increase when the electrode plate are wound, for example. The cracking tends to occur at an innermost round of the winding where its curvature radius is the smallest. The innermost round of the porous film has a diameter R of about 3 mm. Herein, the elongating percentage can be measured by the method specified in JIS C 2318.

In a preferable embodiment of the present invention, the resin binder content in the porous film comprising a filler and a resin binder is smaller in a first surface side, and larger in a second surface side. The first surface refers to a surface of the porous film adhered to an electrode surface, and the second surface refers to the opposite surface thereof.

The porous film may comprise a single film, or may comprise a plurality of films.

The porous film comprising a single film can be obtained by applying a raw material paste of the porous film including a filler, a resin binder, and a liquid component on an electrode, and then drying it. By speeding up volatilization of the liquid component with drying, the resin binder transfers to the second surface side of the porous film with the volatilization of the liquid component. As a result, from an electrode surface toward the second surface side of the porous film, the resin binder content increases gradually. That is, in the thickness direction of the porous film, a concentration gradient is formed in the resin binder.

It is preferable that the drying temperature for the raw material paste applied on the electrode is not less than 100° C. to not more than 180° C. When the drying temperature is below 100° C., the speed for volatilizing the liquid component lowers down to cause a uniform distribution of resin binder concentration in the thickness direction of the porous film. On the other hand, the drying temperature of 180° C. or more may cause an excessive amount of resin binder at the second surface side of the porous film. As a result, electrolyte absorption by the porous film or the electrode will be disturbed to decline discharge characteristics.

Next, the porous film comprising a plurality of films may be made by the following method. First of all, a plurality of raw materials with different resin binder contents for the porous film are prepared. A raw material paste with a low resin binder content is applied on an electrode and dried to form the first film. Afterwards, on the first film, a raw material paste with a high resin binder content is applied and dried to form the second film. When the porous film comprises three or more films, the same operation is carried out by using a raw material paste with a further higher resin binder content. That is, raw material pastes with different resin binder contents are applied, one by one from a material paste with low resin binder content to a material paste with high resin binder content, on an electrode and dried to form films.

The method of forming the porous film comprising a plurality of films is advantageous in that it can voluntarily change the resin binder content in each film, compared with the method of forming the porous film comprising a single film. The porous film also may be formed by laminating a plurality of films respectively including different kinds of fillers.

In the method of forming the porous film including a single layer of film, it is preferable that the resin binder is dissolved in the liquid component. On the other hand, in the method of forming the porous film comprising a plurality of films, the resin binder is not necessarily dissolved in the liquid component. The resin binder just dispersed in the liquid component, for example, may be appropriately used as well.

It is desirable that the filler content in the total of the filler and the resin binder contained in the surface portion of the second surface side of the porous film is not less than 70 wt % to not more than 98 wt %, further desirably 90 to 98 wt %. However, the thickness of the "surface portion" herein is defined as 20% of the thickness of the porous film.

When the filler content is over 98 wt % and the resin binder content is below 2 wt % in the total of the filler and the resin binder contained in the surface portion of the second surface side of the porous film, cracks of the porous film may not be suppressed at the time of winding the electrode plate.

Also, when the filler content is below 70 wt % and the resin binder content is over 30 wt % in the total of the filler and the resin binder contained in the surface portion of the second surface side of the porous film, electrolyte absorption by the porous film or the electrode may be disturbed.

The present invention may be applied to a lithium ion secondary battery in which a positive electrode and a negative electrode are wound in a spiral fashion with only a porous film interposed therebetween, for example. In this case, it is preferable that the thickness of the porous film is 10 to 50 μm, further preferably 10 to 30 μm, in view of fully displaying the function of the porous film to electronically insulate between the electrodes and to improve safety, while maintaining the designed capacity. It is also preferable that the thickness of the plurality of films in total is 10 to 50 μm, further preferably 10 to 30 μm in the case of forming a porous film comprising a plurality of films as well.

The present invention can be also applied to a lithium ion secondary battery in which a positive electrode and a negative electrode are wound in a spiral fashion with a porous film and a separator interposed therebetween. In this case, although the thickness of the porous film is not particularly limited, it is preferable that the thickness of the porous film is 0.5 to 20 μm, in view of fully displaying the function of the porous film to improve safety, while maintaining designed capacity of the battery. In the case of forming a porous film comprising a plurality of films as well, it is preferable that the thickness of the plurality of films in total is 0.5 to 20 μm. Further, it is preferable that the total thickness of the separator and the porous film is 10 to 50 μm, and further preferably 10 to 30 μm.

The present invention can be further applied to a battery in which a positive electrode and a negative electrode are not wound as in the batteries above, but just laminated. The thickness of the porous film is the same as the thickness of the wound-type battery.

It is required that the separator comprises a material which is durable under the environment in which the lithium ion secondary battery is used. For such materials, microporous membrane comprising a polyolefin resin such as polyethylene and polypropylene is generally used, although not limited thereto. The microporous membrane may be a single layer membrane comprising one kind of polyolefin resin, or may be a plural layer membrane comprising two kinds or more of polyolefin resin.

A positive electrode capable of absorbing and desorbing lithium ion usually comprises a positive electrode core material and a positive electrode material mixture carried thereon. The positive electrode material mixture generally includes a positive electrode active material, a binder, and a conductive agent.

For the positive electrode active material, a composite oxide is used. For the composite oxide, lithium cobaltate ($LiCoO_2$), modified lithium cobaltates, lithium nickelate ($LiNiO_2$), modified lithium nickelates, lithium manganate ($LiMn_2O_4$), modified lithium manganates, and the like are preferable. Each modified substance often includes elements such as aluminum and magnesium. Also, some composite oxides include at least two of cobalt, nickel, and manganese.

For the binder included in the positive electrode material mixture, polytetrafluoroethylene, modified acrylonitrile rubber particles, polyvinylidene fluoride, and the like are used, for example, but not limited thereto. It is preferable that the polytetrafluoroethylene and the modified acrylonitrile rubber particles are used in combination with carboxymethyl cellulose, polyethylene oxide, modified acrylonitrile rubber, and the like, which are to be a thickener for a raw material paste of a positive electrode material mixture. The polyvinylidene fluoride alone has both functions of a binder and a thickener.

The negative electrode capable of absorbing and desorbing lithium ion usually comprises a negative electrode core material and a negative electrode material mixture carried thereon. The negative electrode material mixture generally includes a negative electrode active material and a binder, and includes a conductive agent and the like, when necessary.

For the negative electrode active material, carbon materials such as various natural graphites, various artificial graphites, amorphous carbon, composite materials including silicon such as silicide, various alloy materials, and the like are used, for example.

For the binder to be included in the negative electrode material mixture, polyvinylidene fluoride, modified polyvinylidene fluoride, styrene butadiene rubber, fluorocarbon resin, cellulose resin, and the like are used.

For the conductive agent to be included in the positive electrode material mixture and the negative electrode material mixture, carbon blacks such as acetylene black and ketjen black, and various graphites can be used.

The non-aqueous electrolyte generally comprises a non-aqueous solvent and a lithium salt to be dissolved therein. It is preferable that the non-aqueous electrolyte includes vinylene carbonate, cyclohexyl benzene, diphenyl ether, and the like as an additive.

As for the non-aqueous solvent, ethylene carbonate, dimethyl carbonate, diethyl carbonate, ethyl methyl carbonate, propylene carbonate, γ-butyrolactone, and derivatives thereof may be mentioned. These are used in combination of two or more in most cases.

For the lithium salt, lithium hexafluorophosphate ($LiPF_6$), lithium tetrafluoroborate ($LiBF_4$), and the like are used, for example.

In the following, the present invention will be concretely explained based on Examples. However, the following Examples are not to limit the present invention.

Example 1

Figure 2:
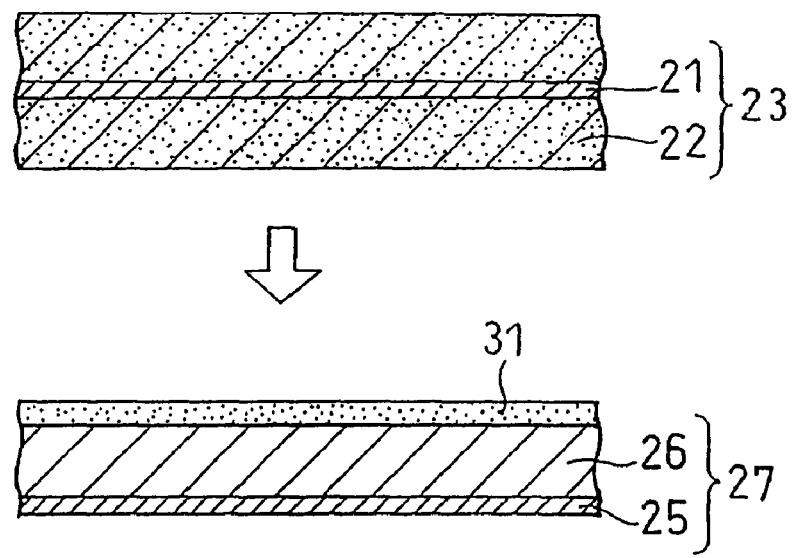
FIG. 2 is a schematic illustration of an example of an arrangement of an electrode to which a porous film in accordance with the present invention is adhered.
Figure 3:
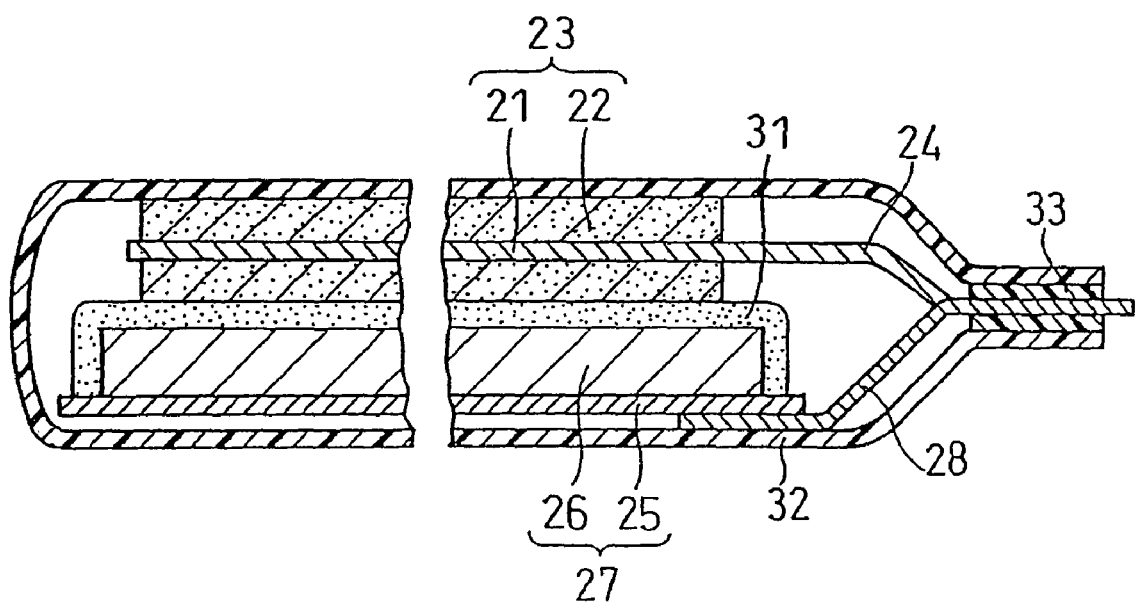
FIG. 3 is a schematic illustration showing a vertical cross section of an example of the lithium ion secondary battery of the present invention.
Figure 4:
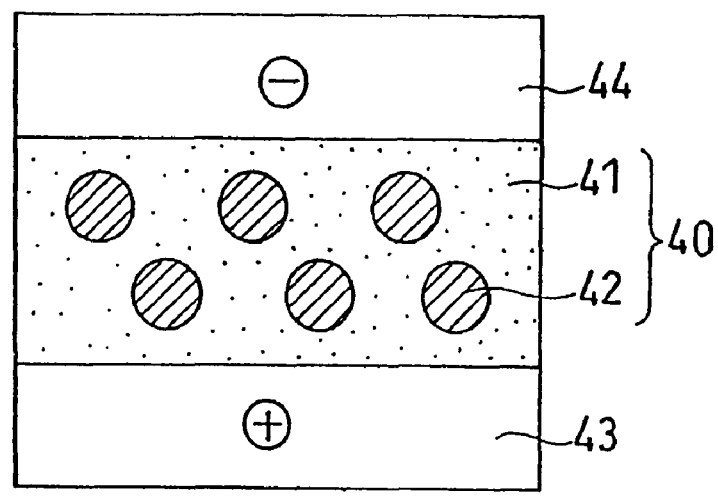
FIG. 4 is a schematic illustration showing the structure of a conventional separator.
Figure 5:
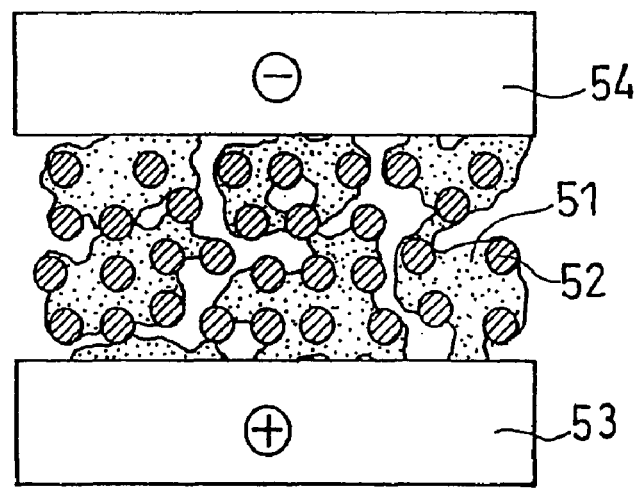
FIG. 5 is a schematic illustration showing the structure of another conventional separator.

FIG. 2 and FIG. 3 are referred in the explanation.

(i) Fabrication of Positive Electrode

To 100 parts by weight of $LiCoO_2$, 4 parts by weight of polyvinylidene fluoride (PVDF) as a binder and 3 parts by weight of acetylene black as a conductive agent were added and subsequently an appropriate amount of NMP (N-methyl-2-pyrrolidone) was added and then kneaded, to prepare a positive electrode material mixture paste.

The obtained positive electrode material mixture paste was applied on both sides of an aluminum foil core material 21 with a thickness of 20 μm, and then rolled so that the density of the active material (density of $LiCoO_2$) in the positive electrode material mixture 22 became 3.3 g/ml, to produce a positive electrode 23. A positive electrode lead 24 made of aluminum was connected to the positive electrode 23.

(ii) Fabrication of Negative Electrode

To 100 parts by weight of spherical artificial graphite, 1 part by weight of styrene-methacrylic acid-butadiene copolymer as a binder and 1 part by weight of carboxymethyl cellulose as a thickener were added and subsequently an appropriate amount of water was added and then kneaded, to prepare a negative electrode material mixture paste.

Herein, for the styrene-methacrylic acid-butadiene copolymer as a binder, BM400B manufactured by ZEON Corporation was used.

The obtained negative electrode material mixture paste was applied onto one side of a copper foil core material 25 with a thickness of 15 μm, and then rolled so that the density of the active material (density of graphite) in the negative electrode material mixture 26 became 1.4 g/ml, to produce a negative electrode 27. For the negative electrode 27, a negative electrode lead 28 made of copper was connected.

(iii) Formation of Porous Film

A raw material paste for porous film was prepared by mixing raw materials with the proportion shown in Tables 1 and 2. The raw material (the total of the filler and the resin binder) content in the paste was set to become 50 wt % in any of the cases.

When BM500B was included in the resin binder, the filler and the resin binder were dispersed or dissolved in NMP, and then kneaded to prepare the raw material paste.

When AD-211 was included in the resin binder, the filler and the resin binder were dispersed or dissolved in water, and then kneaded to prepare the raw material paste.

Then, the raw material paste for porous film was applied with a thickness of 20 μm on one side of the negative electrode 27 so that the negative electrode material mixture 26 was completely covered with the paste, to form a porous film 31. The exterior of the porous film was then observed, to check if peeling occurred or not.

TABLE 1

| Example | Amount of resin binder per 100 parts by weight of filler (parts weight) EM500B | Amount of resin binder per 100 parts by weight of filler (parts weight) PVDF | Average Particle size of filler (μm) Alumina a | Average Particle size of filler (μm) Alumina b | Peeling of porous film | High rate characteristic (%) | Highest temperature reached (°C.) |
|---|---|---|---|---|---|---|---|
| A1 | 2 | 2 | 0.4 | — | NONE | 86.3 | 167 |
| B1 | 0.75 | 0.75 | 0.4 | — | NONE | 89.9 | 165 |
| Comp. 1a | 0.5 | 0.5 | 0.4 | — | EXIST | — | 166 |
| C1 | 3 | 3 | 0.4 | — | NONE | 84.1 | 167 |
| D1 | 4 | 4 | 0.4 | — | NONE | 80.5 | 169 |
| Comp. 2a | 5 | 5 | 0.4 | — | NONE | 73.8 | 165 |
| E1 | 2 | 2 | 0.4 | 0.05 (B/A = 0.125) | NONE | 87.8 | 166 |
| F1 | 2 | 2 | 0.4 | 0.02 (B/A = 0.05) | NONE | 88.8 | 169 |
| G1 | 2 | 2 | 0.4 | 0.01 (B/A = 0.025) | SLIGHTLY | 89.2 | 168 |
| H1 | 2 | 2 | 0.4 | 0.1 (B/A = 0.25) | NONE | 86.6 | 163 |
| I1 | 2 | 2 | 0.4 | 0.15 (B/A = 0.375) | NONE | 85.1 | 166 |
| J1 | 2 | 2 | 0.2 | — | SLIGHTLY | 85.8 | 164 |
| K1 | 2 | 2 | 1 | — | NONE | 86.4 | 166 |
| L1 | 2 | 2 | 2 | — | NONE | 86.7 | 168 |
| M1 | 0.8 | 3.2 | 0.4 | — | SLIGHTLY | 85.6 | 172 |
| N1 | 3.2 | 0.8 | 0.4 | — | NONE | 85.5 | 166 |
| Com. 3a | Microporous membrane | | — | — | — | 88.7 | 188 |
| O1 | 2 | 2 | 0.1 | — | SLIGHTLY | 89.4 | 168 |
| P1 | 2 | 2 | 5 | — | NONE | 81.6 | 168 |

TABLE 2

| Example | Amount of resin binder per 100 parts by weight of filler (parts by weight) AD-211 | Amount of resin binder per 100 parts by weight of filler (parts by weight) CMC | Average particle size of filler (μm) Alumina a | Average particle size of filler (μm) Alumina b | Peeling of porous film | High rate characteristic (%) | Highest temperature reached (°C.) |
|---|---|---|---|---|---|---|---|
| Q1 | 2 | 2 | 0.4 | — | NONE | 86.4 | 166 |
| R1 | 0.75 | 0.75 | 0.4 | — | NONE | 89.7 | 165 |
| S1 | 4 | 4 | 0.4 | — | NONE | 83.8 | 168 |

The raw materials are explained in the following.

[Resin Binder]

For the resin binder, core-shell type rubber particles, and polyvinylidene fluoride (PVDF) with the molecular weight of 350,000 or carboxymethyl cellulose (CMC) are used in combination.

Herein, for the core-shell type rubber particles, BM 500B manufactured by ZEON Corporation or AD-211 manufactured by ZEON Corporation, each includes rubber particles comprising acrylonitrile-acrylate copolymer, were used. The average particle size of the rubber particles was 0.2 μm, respectively.

Figure 6:
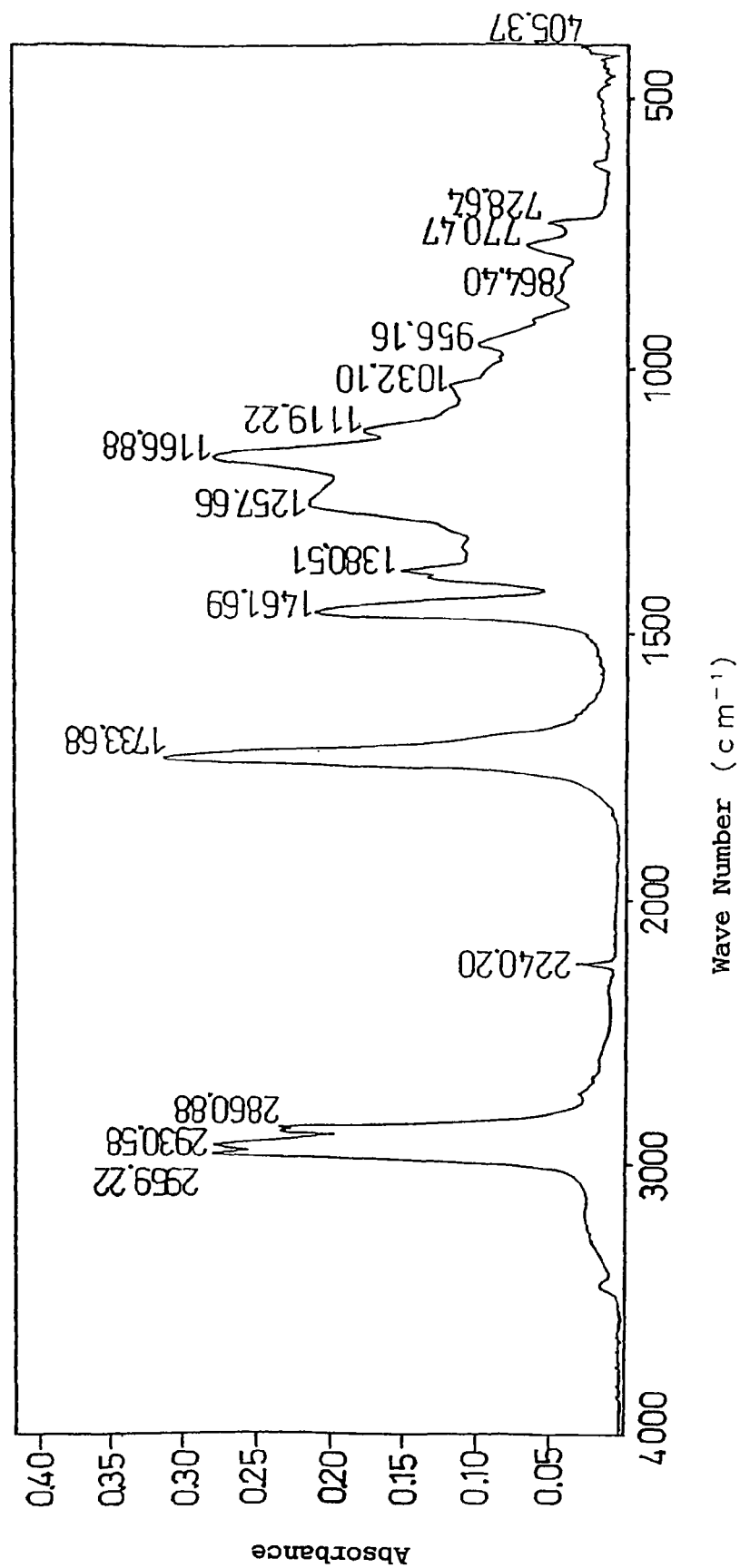
FIG. 6 is an FT-IR absorption spectrum of an example of core-shell type rubber particles.

The absorption spectrum of the rubber particles (BM500B) obtained by an FT-IR measurement is shown in FIG. 6. FT-IR microscope (Continu μm, Light Source: AVATAR-360) manufactured by Nicolet Instrument Corporation was used for the measurement device.

The measurement conditions were set as: sample scan 32 times, background scan 32 times, resolution 4000, and sample gain 1.0. For the measurement sample, rubber particles were dispersed in NMP, applied on KBr plate, and dried to use.

In FIG. 6, the absorption peak observed near 2240 $cm^{-1}$ is based on C≡N stretching vibration of acrylonitrile and absorption peak near 1733 $cm^{-1}$ is based on C=O stretching vibration. In FIG. 6, absorption peak intensity (peak height) based on C=O stretching vibration is about 10 times the absorption peak intensity (peak height) based on C≡N stretching vibration of acrylonitrile unit.

The same FT-IR measurement result was obtained for the rubber particles (AD-211) as well.

[Filler]

For the filler, $Al_2O_3$ was used. Herein, "alumina a" with the average particle size of 0.4 μm was used alone, or a mixture of "alumina a" and "alumina b" with the average particle size 0.01 to 0.15 μm was used. The "alumina a" content and the "alumina b" content in the mixture were set as 90 wt % and 10 wt %, respectively. When the particle size distribution of the alumina mixture was measured, peaks of particle size were observed at 0.35 μm and at 0.2 μm or below, respectively.

(iv) Battery Assembly

Afterwards, as shown in FIG. 2, the positive electrode 23 was disposed on the porous film 31 to form a laminate-type unit cell comprising a pair of positive electrode and negative electrode. This unit cell was enveloped by an outer jacket 32 comprising aluminum laminate sheet, and then, a non-aqueous electrolyte was charged into the outer jacket.

Herein, for the non-aqueous electrolyte, a solvent mixture in which ethylene carbonate, ethyl methyl carbonate, and dimethyl carbonate were mixed with a volume ratio of 1:1:1, dissolving lithium hexafluorophosphate ($LiPF_6$) to give a concentration of 1 mol/liter was used. Also, 4 volume % of vinylene carbonate relative to the solvent mixture was added to the non-aqueous electrolyte.

Then, resin sealing materials 33 covering a part of the positive electrode lead 24 and the negative electrode lead 28 are aligned to be located at an opening end of the outer jacket 32, respectively, and outer jacket 32 was sealed in vacuum while free ends of the respective lead were drawn to the outside. A lithium ion secondary battery with a theoretical capacity of 600 mAh as shown in FIG. 3 was thus completed.

For comparison, a battery was manufactured similarly for the case where only a conventional separator (thickness 20 μm) comprising microporous membrane made of polyethylene instead of porous film was used.

(vi) Battery Safety

After each battery was activated by carrying out predetermined charging and discharging, the batteries were charged with 120 mA until the battery voltage reached 4.2 V, and then discharged with 60 mA until the battery voltage reached 3 V. Then, the same charging was conducted, and the temperatures of each battery with charged state were increased to 160° C. The heating was stopped at 160° C., and the batteries were hung in midair. The heat generation behavior afterwards was measured with a thermocouple. The highest temperatures reached of each battery at this time are shown in Tables 1 and 2.

(vii) High Rate Characteristic of Battery

After each battery was activated by carrying out predetermined charging and discharging, the batteries were charged with 120 mA until the battery voltage reached 4.2 V, and then discharged with 60 mA until the battery voltage reached 3 V. Then, the same charging was conducted, and the batteries were discharged with 600 mA until the battery voltage reached 3 V. Afterwards, the ratio of the discharge capacity at the time of discharging at 600 mA to discharging at 60 mA was obtained by percentage. The results are shown in Tables 1 and 2.

(viii) Evaluation Results

From the results in Table 1, it is revealed that when the amount of the resin binder in the porous film is small, the porous film with sufficient strength can not be obtained due to occurrence of peeling of porous film. Also, it is revealed that rate characteristics greatly decline when the amount of the resin binder is excessive.

On the other hand, when the resin binder content in the porous film was set as 1.5 to 8 parts by weight per 100 parts by weight of filler, a higher safety and preferable high rate characteristic was obtained. This implies that the mixing ratio of the filler and the resin binder is important. Also, this implies that the resin binder has preferable properties for maintaining porous film strength while maintaining lithium ion conductivity.

Next, it is clear that the rate characteristic tends to gradually decline as the ratio of the average particle size of "alumina b" to "alumina a" (value B/A) increases. On the other hand, it is clear that when the value B/A is too small, the strength of the porous film tends to decrease.

When the average particle size of the filler is too small, its surface area becomes large, and the porous film tends to peel off due to insufficient resin binder. On the other hand, when the average particle size of the filler is too large, the resin binder becomes excessive and tends to cause a decline in the high rate characteristic.

Example 2

(i) Fabrication of Positive Electrode and Negative Electrode

A positive electrode and a negative electrode were fabricated in the same manner as Example 1.

(ii) Formation of Porous Film

A raw material paste of porous film was prepared in the same manner as Example 1. Herein, each raw material paste of porous film was prepared by dispersing a filler and a resin binder in NMP with the ratio shown in Table 3 and kneading them. The raw material content in the paste (a total of the filler and the resin binder) was set as 50 wt % in any of the cases. For the filler, an alumina ($Al_2O_3$) with an average particle size of 0.4 μm was used alone.

TABLE 3

| Example | Amount of resin binder per 100 parts by weight of filler (parts by weight) | | Average particle size of filler (μm) | Average pore size of micropore in porous film (μm) | Peeling of porous film | High rate characteristic (%) |
| --- | --- | --- | --- | --- | --- | --- |
| | BM500B | PVDF | | | | |
| A2 | 0.75 | 0.75 | 0.4 | 0.05 | NONE | 87.6 |
| Com. 1b | 0.5 | 0.5 | 0.4 | 0.05 | EXIST | — |
| B2 | 3 | 3 | 0.4 | 0.05 | NONE | 84.1 |
| C2 | 4 | 4 | 0.4 | 0.05 | NONE | 80.9 |

TABLE 3-continued

| Example | Amount of resin binder per 100 parts by weight of filler (parts by weight) BM500B | Amount of resin binder per 100 parts by weight of filler (parts by weight) PVDF | Average particle size of filler (μm) | Average pore size of micropore in porous film (μm) | Peeling of porous film | High rate characteristic (%) |
|---|---|---|---|---|---|---|
| Com. 2b | 5 | 5 | 0.4 | 0.05 | NONE | 76.5 |
| Com. 3b | 2 | 2 | 0.4 | 0.01 | NONE | 75.9 |
| D2 | 2 | 2 | 0.4 | 0.02 | NONE | 84.0 |
| E2 | 2 | 2 | 0.4 | 0.05 | NONE | 86.1 |
| F2 | 2 | 2 | 0.4 | 0.07 | NONE | 85.2 |
| G2 | 2 | 2 | 0.4 | 0.09 | NONE | 82.9 |
| Com. 4b | 2 | 2 | 0.4 | 0.12 | NONE | 77.0 |
| H2 | 0.8 | 3.2 | 0.4 | 0.05 | NONE | 85.8 |
| I2 | 3.2 | 0.8 | 0.4 | 0.05 | NONE | 84.3 |
| J2 | 2 | 2 | 0.2 | 0.05 | SLIGHTLY | 87.2 |
| K2 | 2 | 2 | 1 | 0.05 | NONE | 82.9 |
| L2 | 2 | 2 | 2 | 0.05 | NONE | 80.8 |

As shown in FIGS. 2 and 3, the raw material paste of porous film was applied with a thickness of 20 μm on one side of the negative electrode 27 so that the negative electrode material mixture 26 was completely covered with the paste. A calendaring was conducted on the paste with a predetermined line pressure after drying, to form a porous film 31 having micropores with the average pore size as shown in Table 3. Then, the exterior of the porous film was observed to check if peeling occurred or not.

(iii) Measurement of Average Pore Size

The average pore size of the micropores was measured by a Bubble-point Method using Perm-porometer manufactured by Porous Material Inc. Water was used for the solvent at the time of measuring the flow rate W in wet state.

Although the pore size distribution may be obtained by peeling off the porous film from the negative electrode fabricated for a measurement of pore size, herein, the pore size distribution of the negative electrode was obtained in advance, and then, the pore size distribution of the negative electrode on which the porous film was formed was obtained. Then pore size distribution of only the porous film was obtained from the difference of these pore size distributions. A negative electrode usually has micropores with a pore size of 0.5 to 5 μm, and a porous film usually has micropores with a pore size of 0.02 to 0.09 μm. Therefore, it is easy to calculate the pore size distribution of only the porous film.

Concretely, the flow rate D in dried state was obtained by applying an air pressure up to 250 Psi to the samples of the negative electrode or the negative electrode on which a porous film was formed. Subsequently, the samples were wetted sufficiently by water, and then water was filled into a container in which the samples were installed. The air pressure up to 250 Psi was applied to the samples, to obtain the flow rate W in wet state. The values D and W agreed in the range of 160 to 230 Psi in any of the samples.

In each sample, the distribution of flow rate percentage Q from the bubble point to the point where the value D equaled the value W was obtained. The distribution in the porous film was obtained by subtracting the distribution in the negative electrode from the distribution in the negative electrode on which the porous film was formed. The median value of the pore size d in the obtained distribution was obtained as the average pore size of the micropores in the porous film.

The flow rate percentage Q is defined as the following. When the value D equals the value W, the integrated value of Q becomes 100%.

$$Q = \Delta(W/D) = (Wh/Dh - Wl/Dl) \times 100$$

Wh: flow rate in wet state in high pressure side (unit: L/min)
Wl: flow rate in wet state in low pressure side (unit: L/min)
Dh: flow rate in dried state in high pressure side (unit: L/min)
Dl: flow rate in dried state in low pressure side (unit: L/min)

(iv) Battery Assembly

A lithium ion secondary battery as shown in FIG. 3 with a theoretical capacity of 600 mAh was completed in the same manner as Example 1 except that the obtained porous film in which the average pore size of the micropores was adjusted was formed on the negative electrode.

(v) High Rate Characteristic of Battery

The high rate characteristic of each battery was evaluated in the same manner as Example 1. The results are shown in Table 3.

(vi) Evaluation Results

From the results in Table 3 as well, it is clear that the porous film having sufficient strength can not be obtained due to the peelings occurred in the porous film, when the amount of the resin binder in the porous film is small. When the amount of the resin binder is too large, it is clear that rate characteristic declines. That is, the results of Table 3 imply that the resin binder content in the porous film should be 1.5 to 8 parts by weight per 100 parts by weight of filler in order to obtain superior rate characteristic.

Next, it is clear that even the resin binder content in the porous film and the average particle size of the filler are the same, the rate characteristic declines when the average pore size of the micropores in the porous film is too small, or too large. That is, the results of Table 3 imply that the average pore size of the micropores in the porous film should be 0.02 to 0.09 μm in order to obtain superior rate characteristic.

When the average particle size of the filler is too small, its surface area becomes large and the resin binder becomes insufficient, to cause peelings of porous film. On the other hand, when the average particle size of the filler is too large, the high rate characteristic tends to decline. This is probably due to the fact that the resin binder becomes a surplus, and that the micropores having a pore size appropriate for the transfer of lithium ion can not be obtained.

Example 3

(i) Fabrication of Positive Electrode

A positive electrode was fabricated in the same manner as Example 1 except that the size of the electrode plate was changed to a predetermined size.

(ii) Fabrication of Negative Electrode

A negative electrode was made in the same manner as Example 1 except that the negative electrode material mixture was carried on both surfaces of the copper foil core material to give a density of 1.4 g/ml of the active material (density of graphite), and that the size of the electrode plate was changed to a predetermined size.

(iii) Formation of Porous Film

A filler and a resin binder were dispersed in NMP in proportions shown in Table 4, and then kneaded, to prepare a raw material paste of porous film. The raw material content in the paste (the total of the filler and the resin binder) was set as 50 wt % in any of the cases.

As in Example 1, for the filler, the "alumina a" with an average particle size of 0.4 μm was used alone, or a mixture of the "alumina a" and the "alumina b" with an average particle size of 0.01 to 0.15 μm was used. The "alumina a" content and the "alumina b" content in the mixture were set as 90 wt % and 10 wt %, respectively.

Next, the raw material paste of porous film was applied on both sides of the negative electrode to cover the negative electrode material mixture completely with a thickness of 20 μm, and then dried for 20 minutes at 90° C., to form a porous film. Then, the exterior of the porous film was observed to check whether a peeling occurred or not.

(iv) Battery Assembly

Figure 7:
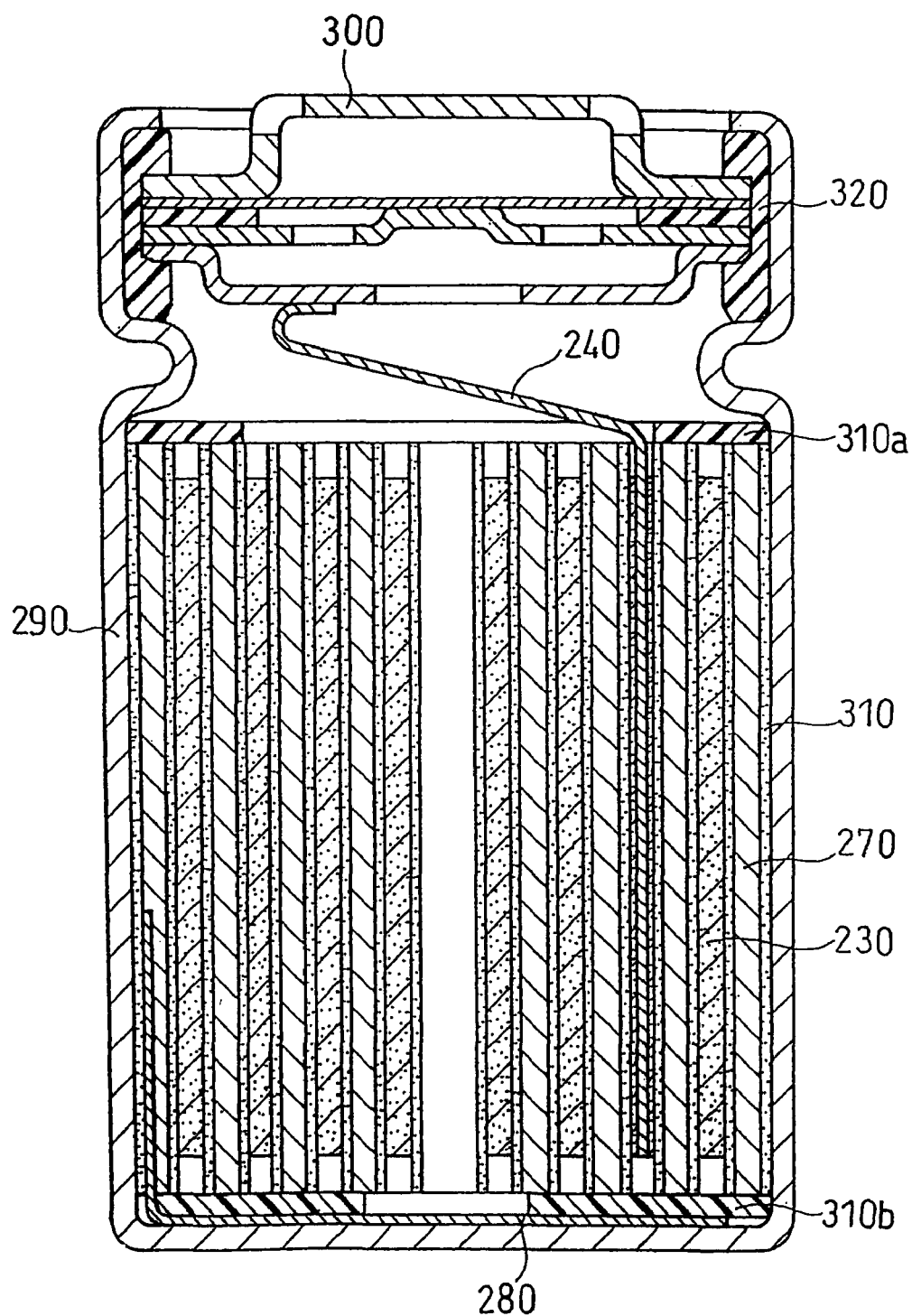
FIG. 7 is a schematic illustration showing a vertical cross section of another example of the lithium ion secondary battery of the present invention.

FIG. 7 is referred to in the following description.

On a porous film 310 adhered to a surface of a negative electrode 270, a positive electrode 230 was disposed, and integrally wound to obtain a cylindrical electrode plate group. Insulating rings 310a and 310b were disposed on top and below of this electrode plate group, and then the electrode plate group was inserted into a battery can 290 made of iron. Then, a positive electrode lead 240 and a negative electrode lead 280 were welded to the inside of a sealing plate 300 and the inner bottom surface of the battery can, respectively. Afterwards, a non-aqueous electrolyte was charged into the battery can, and finally, the opening end of the battery can was caulked interposing a gasket 320 to the outer edge of a sealing plate 300. The same non-aqueous electrolyte as in Example 1 was used.

A lithium ion secondary battery as shown in FIG. 7 with a theoretical capacity of 2000 mAh (18650: diameter 18 mm, height 65 mm, cylindrical shape) was thus completed.

(v) Elongating Percentage of Porous Film

The elongating percentage of porous film was measured as in the following, based on JIS C 2318.

First, the raw material paste of porous film used for each battery was applied on a film made of polyethylene terephthalate (PET) with a thickness of 20 μm, and dried for 20 minutes at 90° C. Afterwards, the porous film after drying was peeled from the PET film, and the obtained porous film was cut to give the size of 15 mm×25 mm, to serve as a sample for measuring the elongating percentage.

The sample for measuring the elongating percentage was disposed in a predetermined tensile tester, and the test was conducted with a tensile speed by which 5 mm of elongation was obtained per 1 minute. Then, the ratio (%) of the elonga-

TABLE 4

| Example | Amount of resin binder per 100 parts by weight of filler (parts by weight) | | Average Particle size of filler (μm) | | Peeling of porous film | Elongating percentage of porous film (%) | Short circuit | High rate Characteristic (%) |
|---------|--------|------|----------|----------|--------|--------|--------|--------|
|         | BM500B | PVDF | Alumina a | Alumina b |        |        |        |        |
| A3 | 2    | 2    | 0.4 | —                    | NONE  | 18.6 | NONE  | 85.7 |
| B3 | 3.2  | 0.8  | 0.4 | —                    | NONE  | 15.1 | NONE  | 88.0 |
| C3 | 0.75 | 0.75 | 0.4 | —                    | NONE  | 15.6 | NONE  | 89.2 |
| D3 | 4    | 4    | 0.4 | —                    | NONE  | 20.8 | NONE  | 83.1 |
| E3 | 2    | 2    | 0.4 | 0.05 (B/A = 0.125)   | NONE  | 20.8 | NONE  | 87.5 |
| F3 | 2    | 2    | 0.4 | 0.02 (B/A = 0.05)    | NONE  | 20.4 | NONE  | 88.4 |
| G3 | 2    | 2    | 0.4 | 0.1 (B/A = 0.25)     | NONE  | 19.5 | NONE  | 86.1 |
| H3 | 0    | 4    | 0.4 | —                    | NONE  | 10.3 | EXIST | —    |
| I3 | 0.5  | 0.5  | 0.4 | —                    | EXIST | 7.7  | EXIST | —    |
| J3 | 5    | 5    | 0.4 | —                    | NONE  | 19.8 | NONE  | 64.9 |
| K3 | 2    | 2    | 0.4 | 0.01 (B/A = 0.025)   | EXIST | 13.8 | EXIST | —    |
| L3 | 2    | 2    | 0.4 | 0.15 (B/A = 0.375)   | NONE  | 15.5 | NONE  | 82.3 | tion at the time when the sample broke relative to the sample length (25 mm) was obtained. The results are shown in Table 4.

(vi) Presence or Absence of Short Circuit

For the batteries completed after the sealing, preliminary charge and discharge were carried out by the patterns shown below, and the batteries were stored for 7 days at 45° C.
Constant current charge: 400 mA (end voltage 4.0 V)
Constant current discharge: 400 mA (end voltage 3.0 V)
Constant current charge: 400 mA (end voltage 4.0 V)
Constant current discharge: 400 mA (end voltage 3.0 V)
Constant current charge: 400 mA (end voltage 4.0 V)

Before and after the above storing, voltages of each, battery were measured, and it was determined that short circuits occurred in those batteries with drops in external voltage of not less than 70 mV after the storage. The results are shown in Table 4.

(vii) High Rate Characteristic of Battery

For those conforming batteries in which no short circuit occurred after the above storage for 7 days at 45° C., charge and discharge of the following patterns were conducted under an atmosphere of 20° C., afterwards.

<1> Preliminary Discharge
Constant current discharge: 400 mA (end voltage 3.0 V)

<2> First Pattern
Constant current charge: 1400 mA (end voltage 4.2 V)
Constant voltage charge: 4.2 V (end current 100 mA)
Constant current discharge: 400 mA (end voltage 3.0 V)

<3> Second Pattern
Constant current charge: 1400 mA (end voltage 4.2 V)
Constant voltage charge: 4.2 V (end current 100 mA)
Constant current discharge: 4000 mA (end voltage 3.0 V)

Then, the ratio of the discharge capacity at a discharge with 4000 mA to the discharge capacity at a discharge with 400 mA was obtained by percentage. The results are shown in Table 4.

(viii) Evaluation Results

From the results in Table 4, it is clear that when the amount of resin binder in the porous film is small, the porous film peels, and the porous film with sufficient elongating percentage can not be obtained. Also, it is clear that the high rate characteristic greatly declines when the resin binder is excessive. That is, the results of Table 4 also imply that the resin binder content in the porous film should be 1.5 to 8 parts by weight per 100 parts by weight of filler. Also, it is clear that when the elongating percentage of porous film is below 15%, the possibilities for a short circuit to occur will become high.

Next, it is clear that the elongating percentage of porous film decreases and high rate characteristic tends to decline gradually with the increase in the ratio of average particle sizes of "alumina b" to "alumina a" (B/A value). On the other hand, it is clear that the elongating percentage of porous film tends to decrease when the B/A value is too small.

Example 4

Batteries 1 to 7

(i) Fabrication of Positive Electrode

A positive electrode material mixture paste was prepared by mixing 3 kg of lithium cobaltate, 1 kg of #1320 (NMP solution including 12 wt % of polyvinylidene fluoride) manufactured by Kureha Chemical Industry Co., Ltd. as a binder, 90 g of acetylene black, and an appropriate amount of NMP, with a double-arm kneader. This paste was applied on an aluminum foil with a thickness of 15 μm, and rolled after drying, to form a positive electrode material mixture layer. At this time, the thickness of an electrode plate comprising the aluminum foil and the material mixture layer was set as 160 μm. Afterwards, the electrode plate was cut to give a width which could be inserted into a battery case with a diameter of 18 mm, and a height of 65 mm, to obtain a positive electrode hoop.

(ii) Fabrication of Negative Electrode

A negative electrode material mixture paste was prepared by mixing 3 kg of artificial graphite, 75 g of BM-400B (aqueous dispersion including 40 wt % of styrene-butadiene copolymer) manufactured by ZEON Corporation as a binder, 30 g of carboxymethyl cellulose as a thickener, and an appropriate amount of water with a double-arm kneader. This paste was applied on a copper foil with a thickness of 10 μm, and rolled after drying, to form a negative electrode material mixture layer. At this time, the electrode plate comprising the copper foil and the material mixture layer was set as 180 μm. Afterwards, the electrode plate was cut to give a width which could be inserted into the above battery case, to obtain a negative electrode hoop.

(iii) Formation of Porous Film

In the batteries 1 to 7, a single porous film was formed on the negative electrode.

A raw material paste of porous film was prepared by putting 960 g of alumina with a median diameter of 0.3 μm as an inorganic oxide filler, 500 g of a modified acrylonitrile rubber (BM-720H manufactured by ZEON Corporation, solid content of 8 wt %, NMP 92 wt %) as a binder, and an appropriate amount of NMP into a double-arm kneader and mixing them. This paste was applied on both sides of the negative electrode, and dried with the drying conditions as shown in Table 5, to form a porous film with a thickness of 6 μm.

(iv) Battery Assembly

The positive electrode and the negative electrode having the porous film were wound interposing a separator with a thickness of 20 μm made of polyethylene microporous membrane, and then inserted into a battery case. Then, 5.5 g of non-aqueous electrolyte was weighed and injected into the battery case, and the opening of the case was sealed. A cylindrical lithium ion secondary battery was thus made.

Herein, for the non-aqueous electrolyte, a mixed solvent of ethylene carbonate, dimethyl carbonate, and methyl ethyl carbonate with a volume ratio of 2:3:3, dissolving lithium hexafluorophosphate (LiPF$_6$) to give a concentration of 1 mol/L was used. Also, to the non-aqueous electrolyte, 3 wt % of vinylene carbonate was added.

Battery 8

A battery 8 was fabricated in the same manner as the battery 1 except that two porous films were formed on the negative electrode by the following manner.

A raw material paste of porous film was prepared by putting 990 g of the same alumina with the battery 1, 125 g of BM-720H as a binder, and an appropriate amount of NMP, into a double-arm kneader and mixing them. This paste was applied on both sides of the negative electrode, dried for 10 seconds at 90° C., to form the first porous film with a thickness of 4 μm.

Then, 980 g of the same alumina with the battery 1, 250 g of BM-720H as a binder, and an appropriate amount of NMP were put into a double-arm kneader, and then kneaded, to prepare a raw material paste of porous film. This paste was applied onto the first porous film, and the paste was dried for 10 seconds at 90° C., to form the second porous film with a thickness of 2 μm.

Battery 9

A battery 9 was fabricated in the same manner as the battery 1 except that two porous films were formed on the negative electrode by the following manner.

First, the first porous film was formed in the same manner as the battery 8. Afterwards, a raw material paste of porous film comprising 900 g of the same alumina as the battery 1, 1250 g of BM-720H as a binder, and an appropriate amount of NMP was prepared. This paste was applied onto the first porous film, and then dried for 10 seconds at 90° C. to form the second porous film with a thickness of 2 μm.

Battery 10

A battery 10 was fabricated in the same manner as the battery 1 except that two porous films were formed on the negative electrode by the following manner.

First, the first porous film was formed in the same manner as the battery 8. Afterwards, a raw material paste of porous film comprising 700 g of the same alumina with the battery 1, 3750 g of BM-720H as a binder, and an appropriate amount of NMP was prepared. This paste was applied on the first porous film, and dried for 10 seconds at 90° C. to obtain the second porous film with a thickness of 2 μm.

Battery 11

A battery 11 was fabricated in the same manner as the battery 1 except that two porous films were formed on the negative electrode in the following manner.

First, the first porous film same as the battery 8 was formed. Afterwards, a raw material paste of porous film comprising 600 g of the same alumina with the battery 1, 5000 g of BM-720H as a binder, and an appropriate amount of NMP was prepared. This paste was applied onto the first porous film, and dried for 10 seconds at 90° C. to obtain the second porous film with a thickness of 2 μm.

Battery 12

A battery 12 was fabricated in the same manner as the battery 9 except that titania was used instead of alumina as an inorganic oxide filler.

Battery 13

A battery 13 was fabricated in the same manner as the battery 9 except that PVDF was used instead of BM-720H as a binder.

Comparative Battery 1

A comparative battery 1 was fabricated in the same manner as the battery 1 except that two porous films same as the first porous film of the battery 8 were laminated on the negative electrode.

Comparative Battery 2

A comparative battery 2 was fabricated in the same manner as the battery 1 except that polyethylene (PE)-made beads were used instead of alumina as a filler.

Comparative Battery 3

A comparative battery 3 was fabricated in the same manner as the battery 1 except that no porous film was made on the negative electrode.

(v) Porous Film Strength

For the negative electrodes above, except for the negative electrode in the comparative battery 3, the negative electrode having a porous film was wound around a round rod of ϕ5 mm as an axis. Afterwards, occurrence of cracks on the porous film and the negative electrode were observed. The porous film and negative electrode which showed no chip, crack, and separation were marked as "OK", and the porous film and negative electrode which showed any of chip, crack, and separation were marked as "NG". The results are shown in Table 5. Additionally, the conditions of formation of each battery are shown in Table 5. When the porous film and the negative electrode showed "NG" in its strength, battery fabrication was discontinued.

(vi) Discharge Characteristic

For the fabricated batteries, preliminary charge and discharge were conducted by the patterns shown below, and the batteries were stored for 7 days under an atmosphere of 45° C.

Constant current charge: 400 mA (end voltage 4.0 V)
Constant current discharge: 400 mA (end voltage 3.0 V)
Constant current charge: 400 mA (end voltage 4.0 V)
Constant current discharge: 400 mA (end voltage 3.0 V)
Constant current charge: 400 mA (end voltage 4.0 V)

Afterwards, the charge and discharge of the following patterns were conducted under an atmosphere of 20° C.

<1> Preliminary Discharge

Constant current discharge: 400 mA (end voltage 3.0 V)

<2> First Pattern

Constant current charge: 1400 mA (end voltage 4.2 V)
Constant voltage charge: 4.2 V (end current 100 mA)
Constant current discharge: 400 mA (end voltage 3.0 V)

<3> Second Pattern

Constant current charge: 1400 mA (end voltage 4.2 V)
Constant voltage charge: 4.2 V (end current 100 mA)
Constant current discharge: 4000 mA (end voltage 3.0 V)

The results of the discharge capacity at this time are shown in Table 5.

(vi) Nail Penetration Test

For the batteries after the evaluation for discharge characteristic was conducted, the following charges were conducted.

Constant current charge: 1400 mA (end voltage 4.25 V)
Constant voltage charge: 4.25 V (end current 100 mA)

An iron-made round nail of ϕ2.7 mm was penetrated into the batteries after charging under an atmosphere of 20° C. with the speed of 5 mm/second from the side face of the battery, and heat generation at the time was observed. The temperatures reached after 1 second and after 90 seconds at the penetration point of the battery are shown in Table 5.

TABLE 5

| | Porous Film | | | | | | | | Discharge Characteristic Discharge Capacity (mAh) | | Nail Penetration Test Highest Temperature | |
|---|---|---|---|---|---|---|---|---|---|---|---|---|
| | | Filler | | | | | | | | | | |
| | Layer | | First Layer Content | Second Layer Content | Binder | Drying Temp. | Drying Time | Porous Film | | | After 1 | After 90 |
| Example | Structure | Kind | (%) | (%) | Kind | (° C.) | (sec) | Strength | 400 mA | 4000 mA | Second | Seconds |
| 1 | One | Alumina | 96 | | BM-720H | 100 | 10 | OK | 2010 | 1869 | 63 | 88 |
| 2 | Layer | | | | | 120 | | OK | 2012 | 1891 | 64 | 87 |
| 3 | | | | | | 140 | | OK | 2013 | 1882 | 64 | 86 |
| 4 | | | | | | 160 | | OK | 2013 | 1852 | 63 | 89 |
| 5 | | | | | | 180 | | OK | 2012 | 1831 | 62 | 88 |
| 6 | | | | | | 200 | | OK | 2009 | 1811 | 77 | 104 |
| 7 | | | | | | 90 | | OK | 2010 | 1790 | 75 | 102 |
| 8 | Two | | 99 | 98 | | | | OK | 2011 | 1890 | 65 | 89 |
| 9 | Layers | | 99 | 90 | | | | OK | 2010 | 1829 | 64 | 87 |
| 10 | | | 99 | 70 | | | | OK | 2012 | 1790 | 63 | 88 |
| 11 | | | 99 | 60 | | | | OK | 2009 | 1740 | 69 | 88 |
| 12 | | Titania | 99 | 90 | | | | OK | 2013 | 1832 | 71 | 90 |
| 13 | | Alumina | 99 | 90 | PVDF | | | OK | 2009 | 1859 | 72 | 146 |
| Comp. battery 1d | | | 99 | 99 | BM-720H | | | NG | Not Evaluated | Not Evaluated | Not Evaluated | Not Evaluated |
| Comp. battery 2d | | PE beads | 99 | 90 | | | | OK | 2012 | 1851 | 146 | Not Evaluated |
| Comp. battery 3d | | Not Made | | | | — | — | Not Evaluated | 2012 | 1710 | 146 | Not Evaluated |

(vii) Evaluation Results

When the drying temperature is 90 to 200° C., and only one layer of porous film with 96 wt % of alumina was formed on the negative electrode, as in the batteries 1 to 7, the results for porous film strength, discharge characteristic, and nail penetration test were all excellent compared with the comparative battery 1. Also, the discharge characteristic of the batteries 1 to 7 was fine compared with the comparative battery 3.

As for the battery 6 with the drying temperature of 200° C., regarding the discharge characteristic under the constant current 4000 mA, discharge capacity was low, and in the nail penetration test, the highest temperature reached after 90 seconds was high, compared with the batteries 1 to 5. The battery 7 with the drying temperature of 90° C. had a higher "highest temperature reached after 90 seconds" in the nail penetration test, compared with the batteries 1 to 5.

Thus, for the batteries 1 to 7, the alumina content in the thickness direction of the porous film was analyzed. As a result, it was revealed that the alumina content in the surface side of the porous film became small and the binder increased when the drying temperature was higher. Especially, in the case of the battery 6 with the drying temperature of 200° C., the alumina content in the surface side of the porous film was 60 wt %. It is considered that the discharge characteristic declines by an increase in the amount of the binder at the surface side of the porous film and an electrolyte absorbance is disturbed, when the drying temperature is 200° C.

Also, in the case of battery 7 with the drying temperature of 90° C., the alumina content in the surface side of the porous film was 95.5 wt %, and there was a slight difference from the alumina content in the entire porous film of 96 wt %. Therefore, difference between the filler content of the surface side of the porous film and the filler content in the entire porous film is desirably 1 wt % or more. Also, in view of the discharge characteristic and the nail penetration test, it is preferable that the drying temperature for the case where a single layer of porous film is formed on the electrode is set to 100 to 180° C.

As in the batteries 8 to 11, when the alumina content of the second layer of the porous film was changed in the range of 60 to 98 wt %, good results were obtained with regard to porous film strength, discharge characteristic, or nail penetration test, compared with the comparative batteries 1 and 3. The battery 11 had a low discharge capacity with regard to discharge characteristic at a constant current of 4000 mA, compared with the batteries 8 to 10. This is probably due to the fact that the micropores in the filler could not be obtained sufficiently, and supply of the electrolyte to the electrode became insufficient because of an excessive amount of binder in the second layer of porous film.

Also, as in the comparative battery 1, when two porous films with 99 wt % alumina were formed on the negative electrode, separation of negative electrode material mixture was observed in the strength test of the porous film by winding and therefore the battery was not fabricated. Thus, in view of porous film strength and discharge characteristic, it is preferable that the inorganic oxide filler content in the surface side of the porous film is in the range of 70 to 98 wt %.

When PE-made beads were used as in the comparative battery 2, the nail penetration test showed the same results with the case where porous film was not provided. This implies that the intended effects of the present invention can not be exerted when a filler having the same degree of heat-resistance with the microporous membrane serving as a separator was used. Therefore, an inorganic oxide has to be selected for the filler.

When titania was used instead of alumina, as in the battery 12, the same effects as in the case of alumina were confirmed. Based on this, it is clear that an inorganic oxide filler other than alumina can be used.

When the porous film comprising PVDF was used for the binder, as in the battery 13, although the temperatures reached after 1 second in the nail penetration test were almost the same as other Examples, the temperature reached after 90 seconds were higher. As a result of disassembling this battery, although the existence of the porous film was confirmed, the short circuiting part was large compared with the batteries 1 to 12. Based on this, as a binder for porous film, it is preferable that a binder which is not easily burned down or melted, particularly a binder having a decomposition temperature of 250° C. or more and a crystalline melting point of 250° C. or more, is used. For example, it is preferable that an amorphous polymer with rubber-like characteristics including an acrylonitrile unit with a decomposition temperature of 320° C. is used as a binder.

When there was no porous film as in the comparative battery 3, the temperatures reached after 1 second showed higher values compared with the case where the porous film was formed on the electrode as in the batteries 1 to 13 and the comparative battery 1. As a result of disassembling these batteries after the test, in the comparative battery 3, the separator melted in a wide range. On the other hand, in the batteries 1 to 13 and the comparative battery 1, the porous film existed on the electrode in the state as it was just manufactured, and heat-shrinkage of the separator was suppressed as well. Base on this, it can be considered that the porous film was not damaged, expansion of the heat generating part due to a short circuit was suppressed, and a thermal runaway was prevented, by using the porous film comprising a binder with a high melting temperature, even when heat was generated by a short circuit at the time of nail penetration.

Herein, characteristics of the nail penetration test, which is a substitutional evaluation for an internal short circuit, and its data analysis are explained. First, causes for the heat generation by a nail penetration can be explained as in the following, based on the results from the past tests.

When a positive electrode and a negative electrode make a partial contact (a short circuit) by a nail penetration, a short circuit current flows in to generate the Joule heat. Then, a separator material with a low heat resistance is melted by the Joule heat to expand the short circuiting part. As a result, the Joule heat is continued to be generated, and the damages in the separator expand by a heat-shrinkage. Based on this, the temperature of the positive electrode is increased to the temperature range (160° C. or more) where the positive electrode becomes thermally unstable. The thermal runaway is thus caused.

Although the case where a porous film is formed on the negative electrode was explained in Examples, the same effects can be obtained even the porous film was formed on a positive electrode, or on both electrodes. Also, in Examples, although the case where a single or two porous films were formed on the negative electrode was explained, the layer can be 3 or more, which can obtain the same effects with the Examples.

INDUSTRIAL APPLICABILITY

The present invention is extremely useful in a field of lithium ion secondary battery, for which safety, excellent charge and discharge characteristics, and high rate characteristic are required. The lithium ion secondary battery of the present invention is useful as a power source for electronic devices such as laptop computers, cellular phones, and digital still cameras.

The invention claimed is:

1. A manufacturing method of the lithium ion secondary battery comprising:
   a positive electrode capable of absorbing and desorbing lithium ion;
   a negative electrode capable of absorbing and desorbing lithium ion;
   a porous film interposed between said positive electrode and said negative electrode; and
   a non-aqueous electrolyte;
   wherein said porous film is adhered to a surface of at least one of said positive electrode and said negative electrode,
   said porous film comprises a filler and a resin binder,
   a content of said resin binder in said porous film is 1.5 to 8 parts by weight per 100 parts by weight of said filler, and
   an amount of said resin binder is smaller in a first surface side where said porous film is in contact with said surface of said electrode, and larger in a second surface side opposite to said first surface side,
   comprising the steps of:
   (a) preparing a paste including 100 parts by weight of a filler, 1.5 to 8 parts by weight of a resin binder including at least an acrylonitrile unit, an acrylate unit, or a methacrylate unit, and a dispersion medium of said filler,
   (b) applying said paste to a surface of at least one of a positive electrode and a negative electrode, and
   (c) drying the paste applied on the surface of said electrode at a temperature of not less than 100° C. to not more than 180° C.

2. The manufacturing method according to claim 1, further comprising after drying the paste:
   (d) applying an additional layer of the paste including 100 parts by weight of a filler, 1.5 to 8 parts by weight of a resin binder including at least an acrylonitrile unit, an acrylate unit, or a methacrylate unit, and a dispersion medium of said filler, to the surface of the dried paste, and
   (e) drying the additional layer of paste at a temperature of not less than 100° C. to not more than 180° C.

3. The manufacturing method according to claim 2, wherein the additional layer of paste applied in step (d) has a higher resin binder content than said paste applied in step (b).

4. The manufacturing method according to claim 2, wherein said dispersion medium is a liquid.

5. The manufacturing method according to claim 2, further comprising the step of rolling the dried paste applied on the surface of said electrode.

6. The manufacturing method according to claim 2, wherein said resin binder comprises rubber particles of core-shell type.

7. The manufacturing method according to claim 2, wherein said filler includes at least $Al_2O_3$.

8. The manufacturing method according to claim 2, wherein said resin binder has a decomposing temperature of 250° C. or more.

9. The manufacturing method according to claim 8, wherein said resin binder has a crystalline melting point of 250° C. or more.

10. The manufacturing method according to claim 2, wherein said porous film comprises a single film, and an amount of said resin binder gradually increases from said first surface side toward said second surface side.

11. The manufacturing method according to claim 2, wherein said filler comprises a mixture of a large particle group and a small particle group, and an average particle size A of said large particle group and an average particle size B of said small particle group satisfy the formula (1):

$0.05 \leq B/A \leq 0.25$.

* * * * *